(12) United States Patent
Krishnaswamy et al.

(10) Patent No.: US 12,230,089 B1
(45) Date of Patent: Feb. 18, 2025

(54) ALL-IN-ONE MULTI-ACCESS WIRELESS DEVICES

(71) Applicant: UIPCO, LLC, San Antonio, TX (US)

(72) Inventors: Pooja Krishnaswamy, McKinney, TX (US); Joel S Hartshorn, Port Orchard, WA (US); Ashley Raine Philbrick, San Antonio, TX (US); Nolan Serrao, Plano, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 371 days.

(21) Appl. No.: 17/683,540

(22) Filed: Mar. 1, 2022

Related U.S. Application Data

(60) Provisional application No. 63/154,922, filed on Mar. 1, 2021.

(51) Int. Cl.
| | | |
|---|---|---|
| *G07C 9/00* | (2020.01) | |
| *G06K 7/08* | (2006.01) | |
| *G07C 9/25* | (2020.01) | |
| *G07C 9/29* | (2020.01) | |

(52) U.S. Cl.
CPC ............. *G07C 9/29* (2020.01); *G06K 7/087* (2013.01); *G07C 9/25* (2020.01)

(58) Field of Classification Search
CPC ............. G07C 9/29; G07C 7/087; G07C 9/25
See application file for complete search history.

(56) References Cited

U.S. PATENT DOCUMENTS

| | | | | |
|---|---|---|---|---|
| 7,278,584 | B1* | 10/2007 | Gandel ................ | B42D 25/369 |
| | | | | 428/126 |
| 2005/0242921 | A1* | 11/2005 | Zimmerman ............ | G07C 9/22 |
| | | | | 340/5.2 |
| 2007/0057038 | A1* | 3/2007 | Gannon ................. | G06Q 20/20 |
| | | | | 235/380 |
| 2007/0197261 | A1* | 8/2007 | Humbel .............. | H04L 63/0853 |
| | | | | 455/558 |
| 2013/0200999 | A1* | 8/2013 | Spodak .................. | G16H 10/65 |
| | | | | 340/5.65 |
| 2016/0012445 | A1* | 1/2016 | Villa-Real .......... | G06Q 20/4016 |
| | | | | 705/44 |
| 2018/0151007 | A1* | 5/2018 | Einberg ................... | G07C 9/28 |
| 2021/0266737 | A1* | 8/2021 | Burke ............... | G06F 16/24553 |
| 2023/0260330 | A1* | 8/2023 | Mango ............... | G06Q 20/3224 |
| | | | | 705/13 |

* cited by examiner

*Primary Examiner* — Nabil H Syed
(74) *Attorney, Agent, or Firm* — Plumsea Law Group, LLC

(57) ABSTRACT

An all-in-one multi-access device that provides access points for opening doors, using credit cards, obtaining and displaying tickets, storing information and other applications. The device may include one or more biometric sensors that ensure that it could only be used by an authorized person. In addition to providing keyless entry, the all-in-one multi-access device may also include a digital screen that can display information for credit cards, concert tickets, and airline tickets. In some embodiments, the device may include a magnetic strip and/or a chip to maintain backwards compatibility with older devices, such as magnetic strip readers and chip readers.

19 Claims, 12 Drawing Sheets

ALL-IN-ONE MULTI-ACCESS WIRELESS DEVICES

TECHNICAL FIELD

This application claims the benefit of Provisional Patent Application No. 63/154,922, filed Mar. 1, 2021, and titled "All-In-One Multi-Access Wireless Devices," which is incorporated by reference herein in its entirety.

This disclosure relates to devices that provide all-in-one access points to financial institutions, door locks, ticketed events, and retail and other outlets.

BACKGROUND

Car fobs and other similar small form factor devices may be used to lock and unlock doors remotely. Access cards, such as magnetic strip cards, may be used to grant a user access to a financial account. However, these devices only have limited functionality. At this time, users need many devices to gain access to different entry points, be they physical entry points such as doors to cars or offices or garages, or remote virtual entry points that need to be used to gain access to bank accounts, credit card accounts, and/or accounts at retail operations such as entertainment venues, restaurants and stores. In fact, many cards carry embedded electronic devices, such as the chips used with chip readers, and the short-range near-field communications (NFC) circuits needed for communications with NFC readers. For these reasons, persons may need to carry many cards and devices as they go about their daily routines. Carrying many such cards and devices on one's person while going about one's daily activities is inconvenient, is difficult to organize, and in some cases a card or device that had been left at home may be needed later in the day when the user is away from his or her home or office.

For all these reasons, there is a need for a system that addresses the issues identified above.

SUMMARY

In one aspect, embodiments include a multi-function access device that has a battery providing power to a display screen, a processor, and a communications app. It also has an RFID chip in communication with the processor; and a display screen showing a plurality of icons. The display screen and the processor are configured such that touching an icon on the touch screen triggers a functionality represented by that icon. The processor is configured to control the display screen, the communications app and the functionality represented by the icons. The processor is also configured to provide key codes to the RFID chip for transmittal to locks such that the functionality of at least one of the plurality of icons includes unlocking a lock. Also, the functionality of at least one of the plurality of icons provides an access point for gaining access via the communications app to data stored in a database of a financial institution. The functionality of at least one of the plurality of icons facilitates wireless payments via the communications app to merchant terminals.

In another aspect, embodiments include a multi-access device that has an antenna controlled by a communications app and is configured to transmit and receive data wirelessly using at least one of Bluetooth, near field communications, WiFi and IEEE 802.11 technologies. It also has a plurality of apps controlled by a processor for providing access to a plurality of access points via the antenna. The access points include access points for gaining access to databases of at least one of a bank, a credit card company, a retailer, and an entertainment venue. The plurality of apps include an app configured to facilitate payments to merchants via the antenna. The device has at least one RFID chip in communication with the processor that is configured to transmit codes to unlock locks, and a screen displaying icons for activating the apps. It also has at least one slot that has a magnetic strip and/or a chip for implementing payments for purchases at retailers. The multi-access device includes a biometric device in communication with a processor for confirming the user as authorized to operate the multi-access device.

In yet another aspect, embodiments include a multi-access device that has a generally rectangular body with a top rectangular region characterized by a first thickness, a side rectangular region characterized by a second thickness, and a main body screen region characterized by a third thickness. It has a chip in the top rectangular region, which is dimensioned to fit into a chip reader and is configured to be read by a chip reader. It has a magnetic strip in the side rectangular region, which is dimensioned to allow the side rectangular region to slide through a magnetic strip reader, and is configured to be read by a magnetic strip reader. The main body screen region has a display screen, a processor, a communications app, a memory, an antenna and a rechargeable battery. It also has an RFID chip configured to receive key codes from the processor. The rechargeable battery provides power to the processor, the communications app, the RFID chip and the memory. The display screen displays a plurality of icons, each icon representing a specific functionality that can be implemented by actuating the icon. At least one of the icons facilitates payments to merchant terminals when it is actuated, at least one of the icons provides access to a financial institution when it is actuated, and at least one of the icons uses the key codes to unlock locks when it is actuated.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The embodiments disclosed herein may be better understood with reference to the following listed drawings and their descriptions. The components in the drawings are schematic rather than representational, and are not necessarily to scale, the emphasis of the disclosure being placed upon illustrating the purpose of implementing the systems and methods disclosed herein. Moreover, in the drawings like reference numerals designate corresponding parts throughout the drawings.

DESCRIPTION OF EMBODIMENTS

Figure 1:
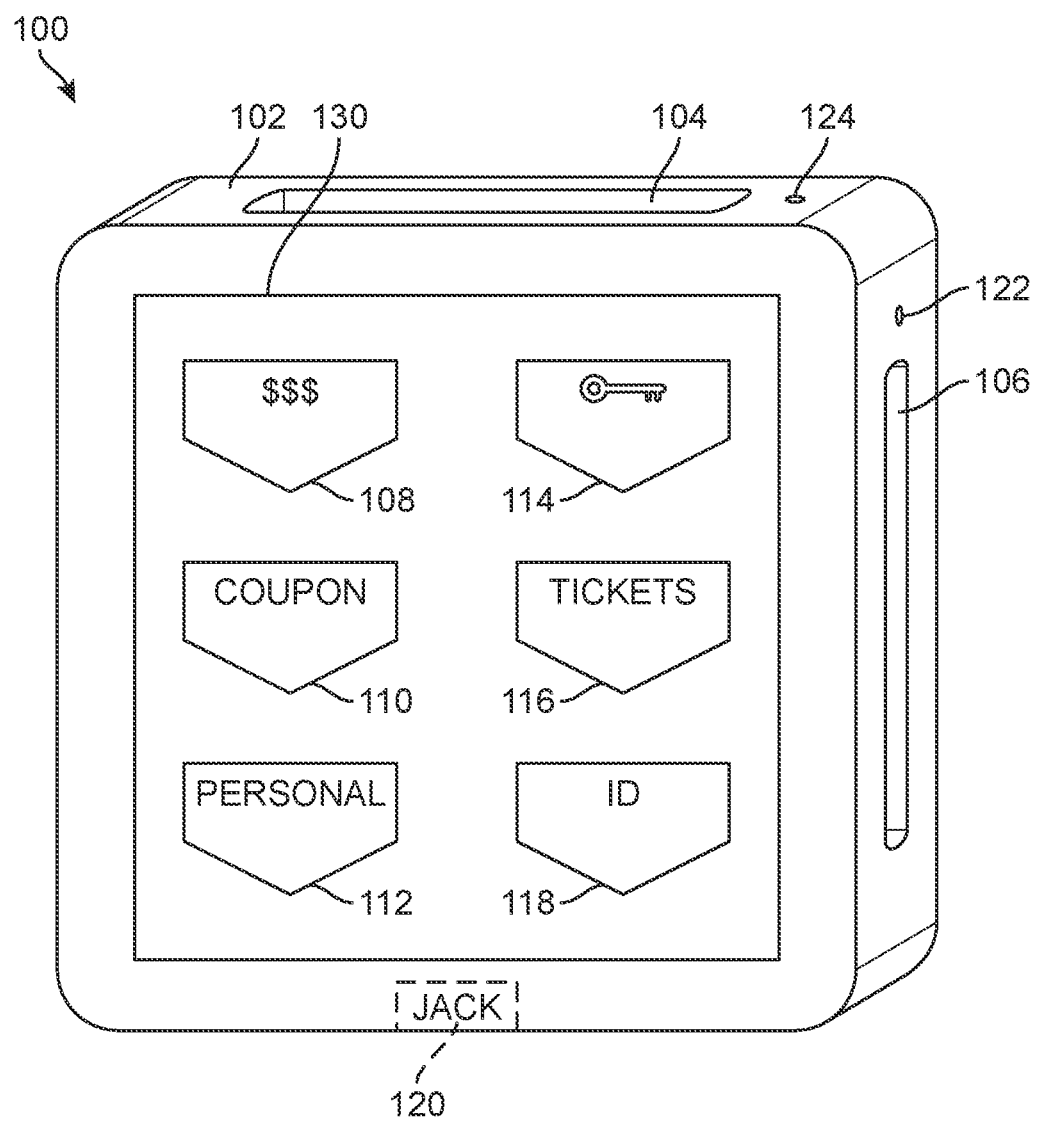
FIG. 1 is a schematic diagram of an all-in-one multi-access device, in one embodiment.

Embodiments disclosed herein include all-in-one multi-access devices that provide an access point for opening doors, using credit cards, and other applications, as described below. In addition to providing keyless entry, the all-in-one multi-access devices may also include a digital screen that can display information for credit cards, concert tickets, and airline tickets. In some embodiments, the multi-access device could include an RFID chip for communication with RFID readers. In some embodiments, the display could be a low powered e-ink screen. In some embodiments, the device can include a deployable magnetic strip and/or chip to maintain backwards compatibility with older devices, such as card readers. For example, the device may not have a magnetic strip exposed in a default position, but the magnetic strip could be deployed (either extended out or uncovered, for example) so the user can swipe a card or insert a card at a card reader. In some embodiments, the device may have a deployable card with a chip that could be read by a chip reader at a bank or retailer, for example.

In some embodiments, the all-in-one multi-access device could include a biometric sensor that can read fingerprints or recognize facial features, or other biometric indicators to prevent the device from being used by an unauthorized person. In some embodiments, the all-in-one multi-access device could be programmed with access codes that allow the user to wirelessly unlock doors, such as a door to their home and/or a door to their car.

In some embodiments, the device could be configured to display important information on the display, even when the device is locked. This information could include, for example, critical health information about the user, should the user be in need of emergency medical help. As one example, the device could display information about a user's chronic conditions, medications, or other instructions that may be relevant should the user be incapacitated. In another embodiment, the device could automatically detect that a user is walking into a particular store and show membership information on its display as the user customer walks into that store.

In one embodiment, the device could receive requests from external devices to display particular information. For example, the device could be used to store insurance information that could be requested automatically by a third party. In one embodiment, the device could be pushed a coupon code and display it on the screen when the user walks into a store with such capabilities.

In some embodiments, the all-in-one multi-access devices may approximately emulate the shape, width and length of a conventional credit card. In such embodiments, the credit-card-shaped device may be of uniform thickness, or it may have different regions having different thicknesses. This variable thickness may be necessary in order to accommodate a rechargeable battery as well as all of the different circuits, memories, and other devices required to implement the different functionalities disclosed herein and to gain access to multiple entry points.

As used herein, the term "financial institution" shall mean a bank, a savings and load, a credit union or a credit card company. The term "IEEE 802.11" shall refer to all of the IEEE 802.11 standards, including IEEE 802.11a, IEEE 802.11b, IEEE 802.11g and IEEE 802.11n. The term "lock/unlock" shall refer to locking a lock, unlocking a lock or both locking and unlocking a lock.

FIG. 1 is a schematic diagram 100 of a front view of an all-in-one multi-access device 102 in one embodiment. In many embodiments, the multi-access device 102 includes an RFID chip (such as RFID chip 318 shown in FIG. 3), that enables contactless payments at merchant terminals equipped with RFID readers by placing the multi-access device close to the RFID reader. Device 102 includes a side slot 106 from which a card with a magnetic strip associated with a financial account associated with the user of device 102 can be deployed by pressing a side button 122. Device 102 includes a top slot 104 out of which a card with a small integrated circuit chip associated with a financial account associated with the user of device 102 can be deployed by pressing a top button 124. Button 122 and button 124 may be physical buttons, buttons that use capacitance sensing, or virtual buttons. Mechanisms for deploying the integrated circuit chip cards and/or the magnetic strip cards are described below with reference to FIG. 4. Thus, payments to merchant terminals may be effectuated with multi-access device 102 in any one of three ways—contactless payments via the RFID reader, chip payments by inserting an integrated chip into a chip reader, and magnetic strip payments via a magnetic strip reader.

Device 102 includes a jack 120 (shown here in phantom) with which to charge a battery (shown in FIG. 3) that powers device 102. Jack 120 may also provide a hard-wired connection from device 102 to other devices, for example to transfer data to device 102. Device 102 includes a display 130 which displays a set of apps. In some embodiments, display 130 includes a touch screen function as a user interface. In some embodiments, display 130 is an "electronic paper" display in grayscale to minimize power usage and battery size. Display 130 features a set of exemplary apps which implement the various functions of device 102. In some embodiments, some of these apps are pre-loaded onto device 102 by the device manufacturer, and some of these apps may have been selectively loaded onto device 102 by the user.

For example, app 108 is an app that provides a link between device 102 and one or more financial accounts, such as a debit or a credit account, associated with the user. This app may be used to make payments to payees such as retailers, restaurants, banks and gas stations. The user may use app 108, for example, to make purchases at stores that have virtual pay platforms that are compatible with device 102. App 114 functions as a virtual key that a user may use to unlock doors, start a car or otherwise gain entry to private spaces, such as homes, commercial buildings and offices. In this embodiment, app 114 can be loaded by the user with a set of codes for wirelessly unlocking doors using an RFID chip (such as RFID chip 318 shown in FIG. 3) and similar access points in a building. In other embodiments, multi-access device 302 (whether or not it has an RFID chip) may communicate with certain door locks or other entry-point devices without using an RFID chip, for example by using other technologies such as near field communications (NFC) or Bluetooth. In some embodiments, app 114 may acquire these codes directly from other devices. In other embodiments, these codes may be programmed into device 102, for example through a software or firmware update.

App 110 is a virtual-coupon app through which stores with compatible systems and networks may send store coupons to device 102 when the user enters the store. App 116 is a virtual ticketing app which, in some embodiments, displays tickets the user has purchased on display 130. In some embodiments, such a displayed ticket includes a barcode that can be read to verify the authenticity of the displayed virtual ticket. In other embodiments, app 116 allows the user to purchase tickets directly when device 102 is in communication with a seller of tickets, as it is linked to a financial account of the user. In other embodiments, rather than simply displaying a virtual ticket, app 116 broadcasts a code corresponding to the purchased ticket for wireless access to an event that requires tickets. In such an embodiment, such a ticket functions as a temporary "key" similar to the function of the virtual key app 114.

App 112 displays, for example, the user's critical health data in an emergency. In some embodiments, the user enters this information through an on-screen keyboard. In some embodiments, authorized third parties, such as a user's primary care physician, can enter and update this information by means of a program in communication with device 102. App 118 contains and displays identifying information for the user. In some embodiments, such identifying information takes the form of a virtual government-issued ID, such as a passport, a driver's license or an employee ID. In some embodiments, government-issued IDs may be securely loaded onto device 102 at a government office through jack 120 or they may be loaded wirelessly. In some embodiments, display 130 is "locked" and none of the apps are accessible to the user until the user "unlocks" it. The user may unlock device 102 by entering a passcode or passing a facial recognition, fingerprint, or other biometric test. In some embodiments, audio biometric verification means may be used by device 102 to ensure that the voice commands it receives, to some degree of confidence, come from an authorized user of device 102. In other embodiments, the user may simply recite a password.

In the embodiment of FIG. 1, the length and width of device 102 may match the standard length and width of a credit card, or it may have different dimensions. The thickness of device 102 may be 2, 3 or 4 times of the standard thickness of a credit card, or anywhere between 2 and 4 (inclusive) times the standard thickness of a credit card. As an example, credit cards may typically have a thickness of approximately 0.75 mm. Therefore, in some embodiments, the thickness of device 102 may be between 1.5 mm to 3 mm. In other embodiments, some portions of the device could be thicker than 3 mm. In some embodiments, device 102 may include a loop that may be used to attach it to a key chain. Also, in some embodiments, certain of the functions of device 102, such as deployment of door unlocking signals, can occur via voice commands from an authorized user of device 102.

Figure 2:
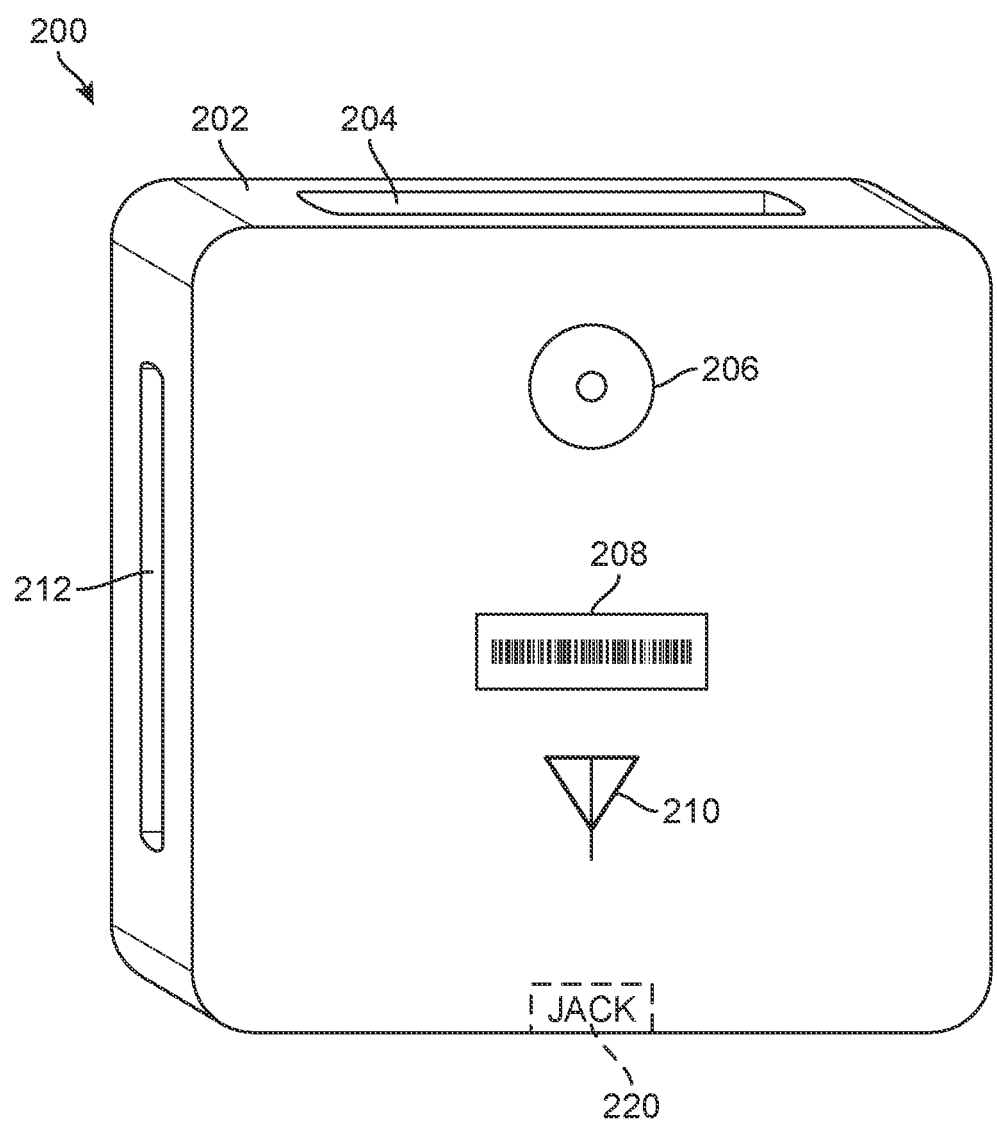
FIG. 2 is a schematic diagram of a back view of an all-in-one multi-access device, in one embodiment.

FIG. 2 is a schematic diagram 200 of a back view of an all-in-one multi-access device 202 in one embodiment. This view shows an image capture device 206. Image capture device 206 may perform a facial recognition test on the user of device 202 to make sure he or she is an authorized user of the device. In some embodiments, storage of facial pictures of authorized users of device 202 occurs when the device is first set up. In some embodiments, image capture device 206 is a high-resolution camera in communication with facial recognition analysis software.

FIG. 2 also shows a fingerprint reader 208. Fingerprint reader 208 reads one or more of the fingerprints of the user of device 202 to ensure that the user is an authorized user of the device. In some embodiments, storage of fingerprints of authorized users of device 202 may happen when the device is first set up, or it may happen at a later time.

Antenna 210, shown in FIG. 2, is associated with local wireless communications between device 202 and compatible devices, including compatible merchant terminals, other compatible all-in-one multi-access devices, and other compatible third-party devices that manage access to an area, such as a smart door. Antenna 210 may also be used to facilitate communications between device 202 and a user's laptop, so that the user may, for example, download information onto the device. For example, the user may wish to download updated medical data such as his or her blood pressure, allergies, blood type and current medications. In some embodiments, antenna 210 uses NFC and/or Bluetooth communication technologies and protocols for these wireless communications.

FIG. 2 shows a jack 220, in phantom. Jack 220 provides a means with which to charge a battery that powers device 202. It may also provide a hard-wired connection to device 202 from other devices, for example to transfer information from an external device such as a laptop to device 202.

Top slot 204 allows a card containing an integrated circuit chip (shown in FIG. 4, for example) associated with a financial account associated with the user of device 202 to be deployed from device 202. In some embodiments, the integrated circuit chip deployed from top slot 204 can be read by compatible merchant terminals for debiting payments from an associated financial account. Side slot 212 allows a card containing a magnetic strip (shown in FIG. 4) to be deployed, so that payments to retailers that rely on magnetic strip readers can be made using the all-in-one access device 202. Mechanisms for deploying the cards containing a chip and/or a magnetic strip are described below.

Figure 3:
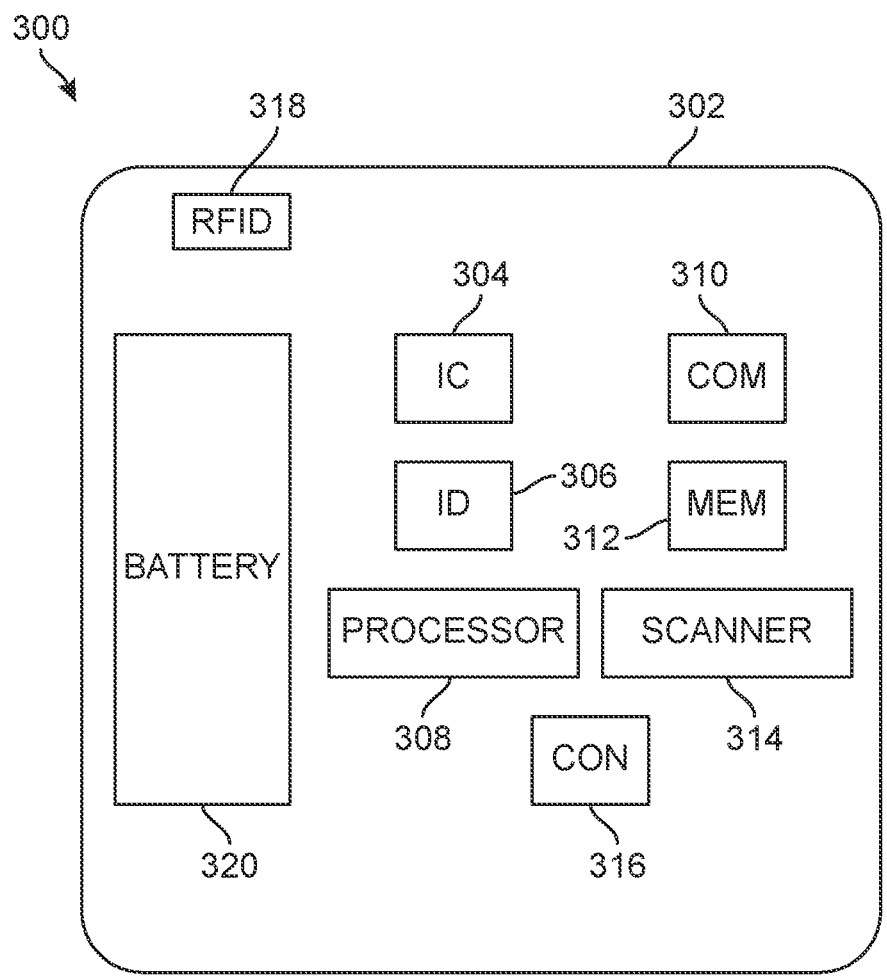
FIG. 3 is a schematic diagram showing certain components of an all-in-one multi-access device in one embodiment.

FIG. 3 is a schematic diagram 300 showing internal components of an exemplary all-in-one multi-access device 302 in one embodiment. In this view, multi-access device 302 includes a battery 320, which stores the energy needed to power device 302. Multi-access device 302 includes a processor 308, which acts as a control module for the components of device 302. Multi-access device 302 also includes an RFID chip 318, that enables device 302 to, for example, open doors at facilities such as offices, commercial buildings, garages and parking lots; and to make payments to merchants who have RFID readers in the payment terminals. RFID chip 318 is in communication with processor 308. Also, in many embodiments, RFID chip 318 is an active RFID chip because it is powered by battery 320. In other embodiments, RFID chip 320 may be a passive RFID chip. Processor 308 and RFID chip 318 are configured to allow processor 308 to enter different access codes into RFID chip. In other embodiments, multi-access device (whether it has or does not have an RFID chip) uses other near-field communications (NFC) technologies to unlock, for example, car doors. In some cases, processor 308 will enter key codes for certain entry points that rely on RFID technologies such as garages and office buildings, for example, into RFID chip 318. The user may also decide to use processor 308 to enter key codes for other spaces, such as the user's workplace, residential building, office building, garage and/or parking lot, into memory 312.

Device 302 includes an image capture device 304 for performing a facial recognition test on a user. Device 302 further includes ID storage 306 which securely stores and acquires ID information for a user of device 302. In some embodiments, ID storage 306 is in wireless communication with compatible devices at a government office or at an employer's office to securely acquire ID information for a user of device 302. Device 302 includes a connection module 316. Connection module 316 is associated with wired connections to device 302, for example, for charging or for making a wired connection between device 302 and another device. Device 302 includes a memory 312 which stores a variety of data and applications, including pre-loaded applications and data that would be typically loaded onto this device and applications and data that have been selectively stored by the user of device 302. These apps and the data collectively implement the functions of device 302. Device 302 includes a communications app 310 for wirelessly exchanging data and instructions via an antenna such as antenna 210 (shown in FIG. 2) between device 302 and other compatible devices such as compatible merchant terminals, other compatible all-in-one multi-access devices, and other compatible third-party devices that manage access to an area (such as a smart door). In some cases, hotels may enter hotel room codes into the RFID chip via antenna 210, communications app 310 and processor 308. In other cases, the hotel may use other NFC technologies for its room door locks. In those cases, the hotel would transmit the necessary room codes to the multi-access device, which would store the codes in its memory 312. These codes could then be retrieved for unlocking room doors using NFC technologies.

Device 302 may include a scanner app 314 in communication with a fingerprint reader (such as fingerprint reader 208) configured to take a fingerprint of a user of device 302 to ensure that the user is authorized to use device 302. In some embodiments, scanner app 314 feeds fingerprint data of the current user of device 302 to a fingerprint analysis algorithm running on processor 308 for comparison to fingerprints of authorized users of device 302 stored in memory 312. In some embodiments, device 302 may include an image capture app 304 in communication with an image capture device (such as image capture device 206). for comparison with stored images. Image capture app 304 feeds images received from an image capturing device (such as image capture device 206) to an image recognition algorithm running on processor 308 for comparison to images stored in memory 312.

Figure 4:
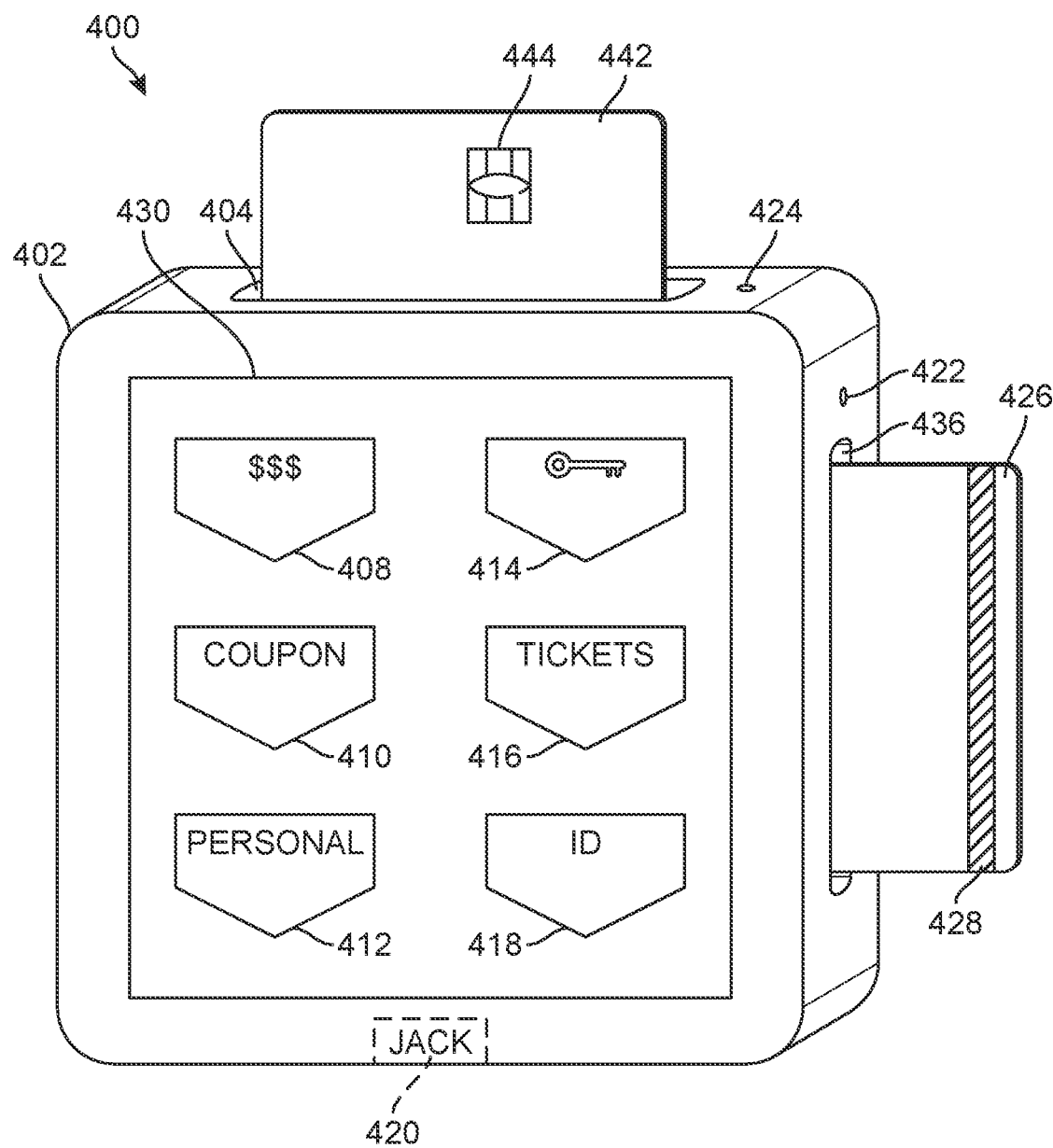
FIG. 4 is a schematic diagram of an all-in-one multi-access device showing a deployable magnetic strip and a deployable chip, in one embodiment.

FIG. 4 is a schematic diagram 400 of a front view of an all-in-one multi-access device 402 showing a deployable magnetic strip card 426 and a deployable chip card 442. As noted above with respect to FIG. 3, multi-access device 402 may include an RFID chip such as RFID chip 318 shown in FIG. 3 that may be used to communicate with merchant terminals. Generally, all three (magnetic strip, chip and RFID chip) of these devices may be linked to or associated with a financial account or credit card account, in one embodiment. In this embodiment, magnetic strip card 426 is compatible with merchant terminals or other access management devices that read account information (such as financial account information) or other access information that is encoded magnetically on a magnetic strip 428 affixed to magnetic strip card 426. In this embodiment, magnetic strip card 426 emerges from a side slot 436 and is deployed by the user of device 402 by a push of a side button 422.

Several mechanisms may be used to deploy the magnetic strip card 426 and/or the chip card 442. For example, in some embodiments, the slots may be wide enough so that a user can grip the cards and pull them out as needed. Alternatively, the cards may be kept in place with spring-loaded catches. Pushing the cards in would release the cards from the catch, and they would pop out. In those embodiments, button 424 and button 422 would not be needed. In other embodiments, the cards may be spring-loaded and held in place by a catch, and pressing button 424 and button 422 would cause the catch to retract, thus releasing the cards. The cards could be re-engaged with the catch just by pushing them back in. In yet other embodiments, servomechanisms may be used to deploy or retract the cards at the push of button 424 and button 422. In those embodiments, the servomechanisms would be powered by battery 320 (shown in FIG. 3).

In this embodiment, deployable chip card 442 is compatible with merchant terminals or other access management devices that read account information (such as financial account information) or other access information that is encoded digitally on an integrated circuit chip 444 affixed to chip card 442. In this embodiment, deployable chip card 442 emerges from a top slot 404 and is deployed by the user of device 402 at the push of a top button 424.

In this embodiment, device 402 includes a jack 420 (shown here in phantom) with which to charge a battery that powers device 402. Jack 402 may also provide a hard-wired connection to device 402 for other devices, for example to transfer data to device 402. For example, key codes could be input via jack 420 so that they could be entered into an RFID chip, or they could be transmitted using Bluetooth or other technologies. Device 402 includes a display 430 which displays a set of apps such as apps 408 to 418. In some embodiments, display 430 includes a touch screen function as a user interface. In some embodiments, display 430 is an "electronic paper" display in grayscale to minimize power usage and battery size.

Display 430 features a set of exemplary apps which implement the various functions of device 402. For example, app 408 is a virtual pay-type app that provides a link between device 402 and one or more financial accounts, such as a debit or credit account, associated with the user. The user may use app 408, for example, to make purchases at stores with compatible virtual pay platforms with device 402. App 414 is a virtual key-type app through which the user unlocks doors or otherwise gains entry to private spaces, such as cars, homes, commercial buildings, residential buildings, offices, garages, parking lots and other spaces via an RFID chip such as RFID chip 318 shown in FIG. 3. In this embodiment, app 414 can be loaded by the user with a set of door-specific codes that may be transmitted through a processor (such as processor 308) for wirelessly unlocking doors and similar access points in a building. In some embodiments, app 414 acquires these codes directly from wireless devices that are used for door access. In other embodiments, these codes must be programmed into device 402, for example through a software or firmware update. App 410 is a virtual-coupon app through which stores with compatible systems and networks send store coupons to device 402. App 416 is a virtual ticketing app through which, in some embodiments, tickets the user has purchased are loaded onto device 402 and may be displayed on display 430. In some embodiments, such a displayed ticket includes a barcode that can be read to verify the authenticity of the displayed virtual ticket. In other embodiments, app 416 allows the user to purchase tickets directly when device 402 is in communication with a seller of tickets, as it is linked to a financial account of the user. In other embodiments, rather than simply displaying a virtual ticket, app 416 broadcasts a code corresponding to the purchased ticket for wireless access to an event that requires tickets. In such an embodiment, such a ticket functions as a temporary "key" similar to the function of the virtual key app 414.

App 412 contains and displays critical health information for the user. In some embodiments, the user may enter this information through an on-screen keyboard or by transmitting the information from another device such as a laptop computer, a tablet or a smart phone. In some embodiments, authorized third parties, such as a user's primary care physician, may enter and update this information by means of a program in communication with device 402. App 418 contains and displays identifying information for the user, such as an employee ID or a student ID. In some embodiments, such identifying information takes the form of a virtual government-issued ID, such as a passport or driver's license. In some embodiments, a virtual government-issued ID or an employee ID may be securely loaded onto device 402 at a government or other office through jack 420 or wirelessly.

In some embodiments, a single card that has both a magnetic strip and a chip may be used instead of having two cards. In that case, only a single slot may be needed, such as either top slot 404 or side slot 436. As noted above, multi-access device 402 may have an RFID chip that could enable payments to merchants that have RFID-enabled terminals.

Figure 5A:
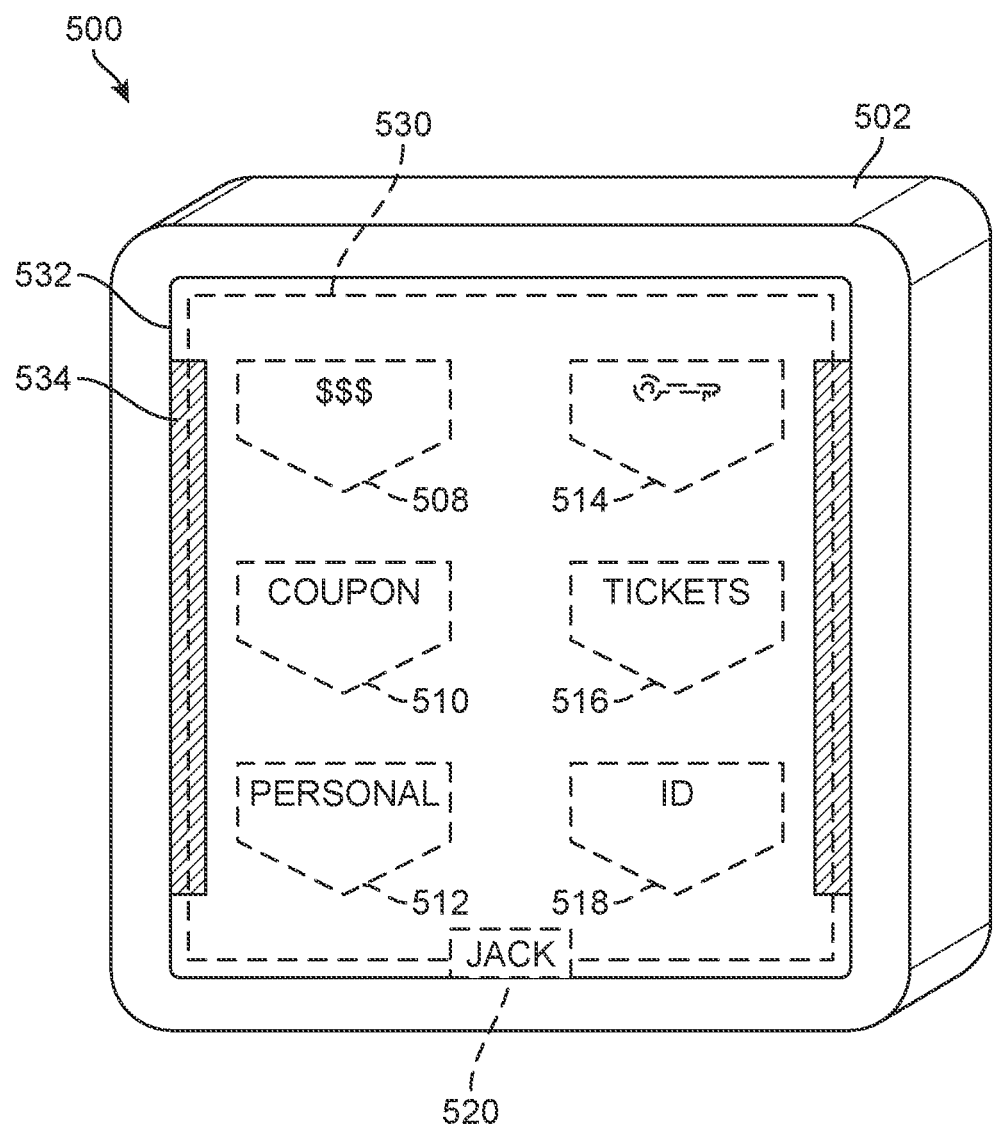
FIG. 5A is a schematic diagram of an all-in-one multi-access device showing guides that hold a cover in place, in one embodiment.
Figure 5B:
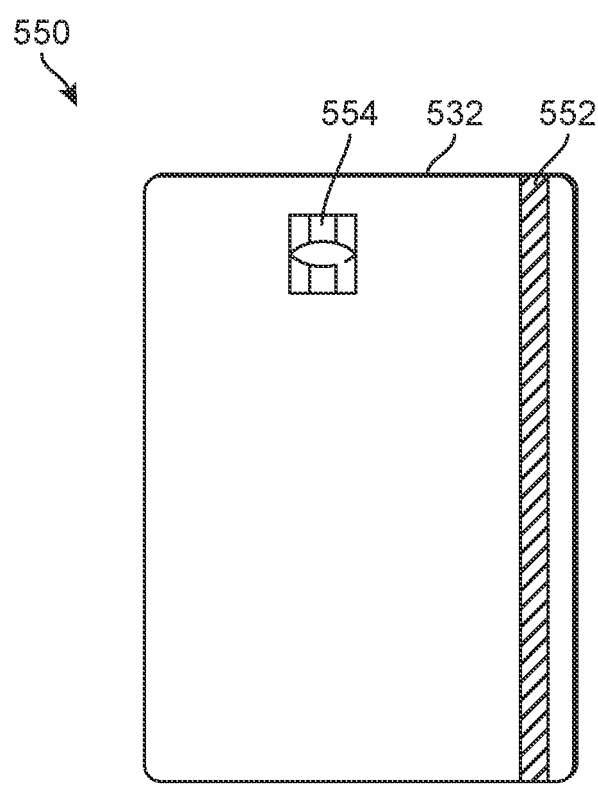
FIG. 5B is a schematic diagram of the cover of the all-in-one multi-access device of FIG. 4, in one embodiment.

FIG. 5A is a schematic diagram 500 of a front view of another all-in-one multi-access device 502 showing guides 534 that hold a cover in place, in one embodiment. Sliding a cover over display 530 protects display 530 from scratches and other potential damage and prevents the user from accidentally unlocking display 530. In this embodiment, the cover, as shown in FIG. 5B, provides backwards compatibility for merchant terminals and other access devices with which device 502 cannot make payments to terminals that do not accept wireless payments from mobile devices.

Display 530 displays a set of apps. In this embodiment, app 508 is a virtual pay-type app that provides a link between device 502 and one or more financial accounts, such as a debit or credit account, associated with the user. The user uses app 508, for example, to make purchases at stores with compatible virtual pay platforms with device 502. App 514 is a virtual key-type app through which the user may use an RFID chip to unlock doors or otherwise gain entry to private spaces, such as homes, commercial buildings, residential buildings, offices, garages and parking lots. In other cases, multi-access device 502 may use near field communications (NFC) technologies or Bluetooth to unlock doors. In this embodiment, app 514 can be loaded by the user with a set of codes for wirelessly unlocking doors and similar access points in a building. In some embodiments, app 514 acquires these codes directly from other wireless devices that are used for door access. In other embodiments, these codes must be programmed into device 502, for example through a software or firmware update. App 510 is a virtual-coupon app through which stores with compatible systems and networks could send store coupons to device 502. App 516 is a virtual ticketing app through which, in some embodiments, tickets the user has purchased are loaded onto device 502 and may be displayed on display 530. In some embodiments, such a displayed ticket may include a barcode that can be read to verify the authenticity of the displayed virtual ticket. In other embodiments, app 516 allows the user to purchase tickets directly when device 502 is in communication with a seller of tickets, as it is linked to a financial account of the user. In other embodiments, rather than simply displaying a virtual ticket, app 516 broadcasts a code corresponding to the purchased ticket for wireless access to an event that requires tickets. In such an embodiment, such a ticket functions as a temporary "key" similar to the function of the virtual key app 514.

App 512 may contain and display a user's critical health information. In some embodiments, the user enters this information through an on-screen virtual keyboard. In some embodiments, authorized third parties, such as a user's primary care physician, can enter and update this information by means of a program in communication with device 502. App 518 contains and displays identifying information for the user. In some embodiments, such identifying information takes the form of a virtual government-issued ID, such as a passport or driver's license. In some embodiments, such a virtual government-issued ID is securely loaded onto device 502 at a government office through, for example, jack 520 or wirelessly.

Device 502 includes a jack 520 (shown here in phantom) with which to charge a battery that powers device 502 and to provide a hard-wired connection to device 502 from other devices, for example to transfer information to device 502.

FIG. 5B is a schematic diagram 550 of an exemplary back side of a cover 532 for an all-in-one multi-access device that also acts as an access card linked to a financial account in one embodiment. In this embodiment, the thickness of cover 532 may roughly match the thickness of standard credit and debit cards. Thus, cover 532 provides backwards compatibility for merchant terminals with which the device cannot communicate wirelessly. Cover 532 includes a magnetic strip 552 which encodes financial account access information magnetically. In this embodiment, magnetic strip 552 is compatible with merchant terminals or other access management devices that read account information (such as financial account access information) or other access information that is encoded magnetically on magnetic strip 552. Cover 532 includes an integrated circuit chip 554 which encodes financial account access information digitally. In this embodiment, chip 554 is compatible with merchant terminals or other access management devices that read account information (such as financial account access information) or other access information that is encoded digitally on chip 554. As noted above with reference to FIG. 3, multi-access device 502 may have an RFID chip to enable payments to merchants that have RFID-enabled terminals.

Figure 6A:
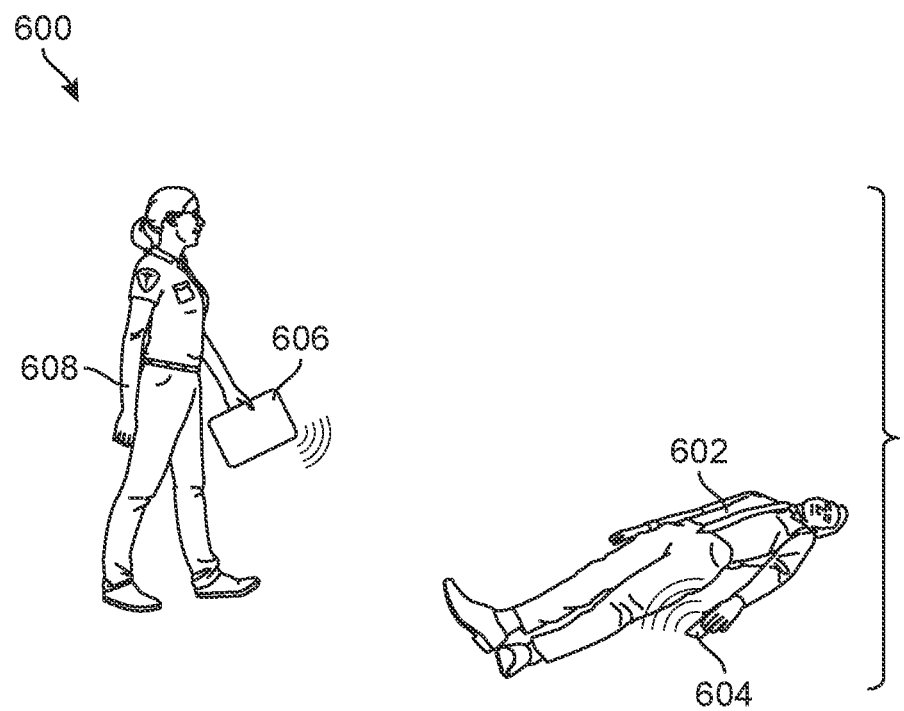
FIG. 6A is an illustration of an emergency medical technician accessing a user's all-in-one multi-access device, in an embodiment.

FIG. 6A is an illustration 600 of how an emergency medical technician 608 may access a user's all-in-one multi-access device 604 to view medical information in one embodiment. In this embodiment, user 602 is incapacitated due to a medical emergency. In this embodiment, device 604 is locked. In most embodiments, device 606 may use a special code provided to EMTs and other medical personnel to unlock device 604. Emergency medical technician 608 uses an emergency information display device 606 to send a signal to device 604 which causes device 604 to display on its screen identifying information and medical information about user 602. In this embodiment, user 602 has stored such information on device 604 using an app which facilitates the display of this information when triggered by emergency information display device 606. Note that in this embodiment, device 604 is still locked, and only the information that has been so stored by the user is displayed on the display of device 604.

Figure 6B:
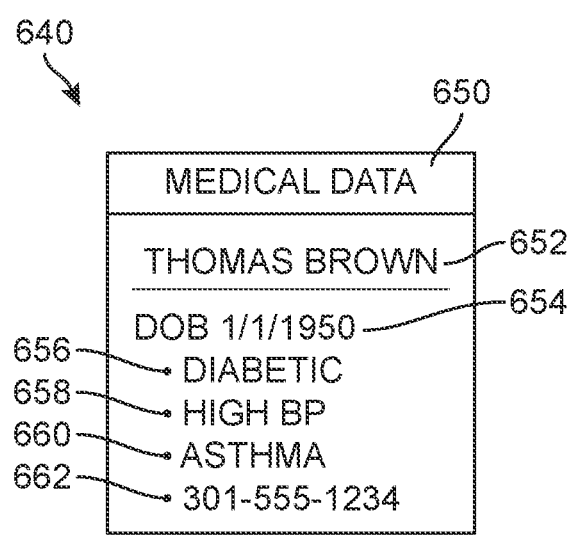
FIG. 6B is an illustration of exemplary medical data that may be stored in a user's all-in-one multi-access device, in one embodiment.

FIG. 6B is an illustration 640 of personal and medical information 650 an emergency medical technician views using a user's all-in-one multi-access device in one embodiment. In this embodiment, an emergency information display device deployed by the emergency medical technician triggers the display of personal and medical information 650 on the user's all-in-one multi-access device. Medical and personal information 650 so displayed includes the user's name 652; the user's date of birth 654; the user's phone number 662; and other medical factors pertaining to care for the user. In illustration 640, a medical factor 656 identifies the user as being diabetic; medical factor 658 notes that the user suffers from high blood pressure; and a medical factor 660 identifies the user as asthmatic.

Figure 7A:
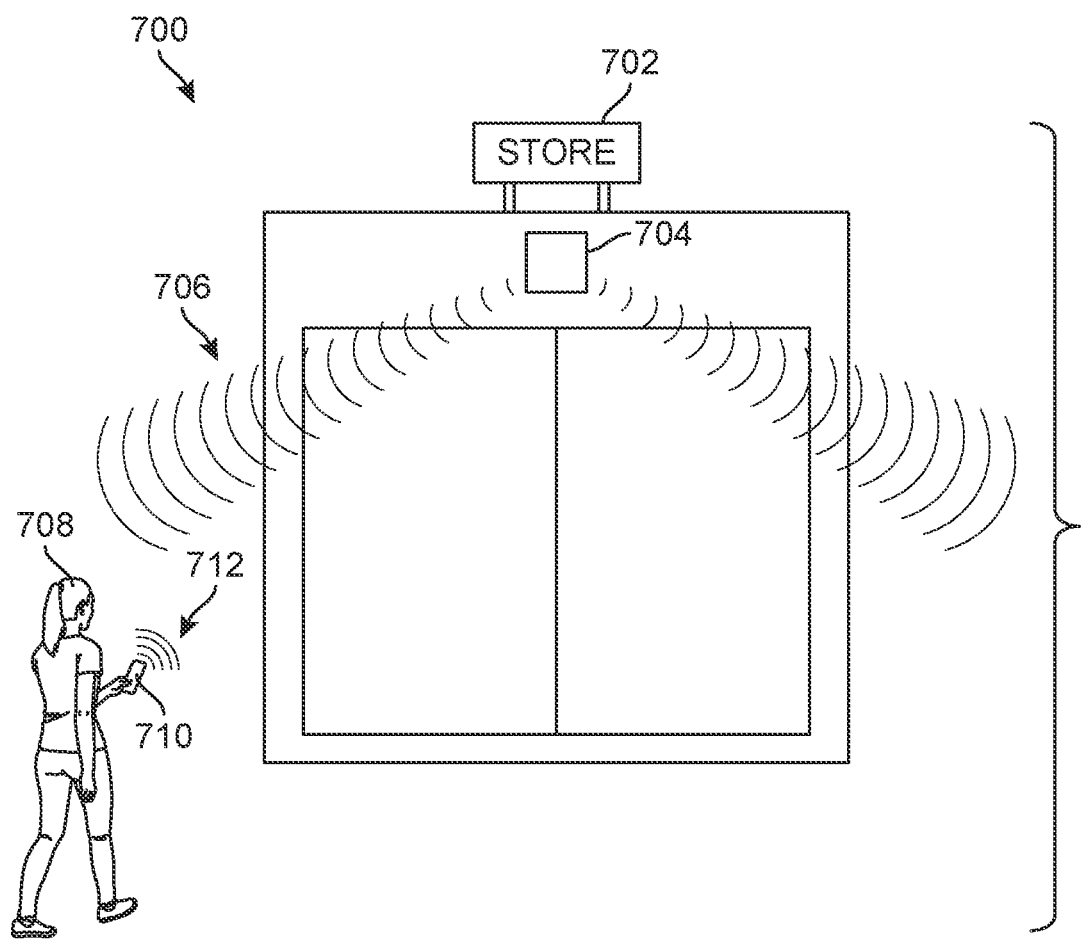
FIG. 7A is an exemplary illustration of an all-in-one multi-access device wirelessly communicating with a store, in an embodiment.

FIG. 7A is an illustration 700 of a user 708 communicating wirelessly via an all-in-one multi-access device 710 with a store 702, in one embodiment. In this embodiment, a master local wireless device 704 associated with store 702 broadcasts a device search signal 706 with which to temporarily connect wirelessly via, for example, a WiFi network, to users' devices, such as device 710. In this embodiment, a virtual coupon app running on device 710 mediates the potential connection between master local wireless device 704 and the user's device 710. If the virtual coupon app allows such a connection, then the user's device 710 sends a return signal 712 to master local wireless device 704. This then triggers master local wireless device 704 to send current store information, such as coupons, over the store's WiFi network, to the user's device 710 for display to user 708. In some embodiments, after master local wireless device 704 sends this information to device 710, it terminates the local wireless connection to device 710.

In some embodiments, user 708 programs a virtual coupon app to allow connections to some stores (for example, for the receipt of store coupons) and not for others. In some embodiments, upon the receipt of search signal 706 by device 710, device 710 posts a message to the user asking if she would like to connect to master wireless device 704 for the receipt of coupons and other current store information. In some embodiments, such a connection between master local wireless device 704 and device 710 may occur over the store's WiFi network or other appropriate network.

In an alternative embodiment, rather than device 710 displaying store information (such as coupons) based upon a local wireless connection between device 710 and a master device associated with store 702, device 710 may display store information (such as member identification information for the store) using other triggers. In some embodiments, such a trigger could be the GPS location of the store. In this embodiment, user 708 has programmed device 710 so that when its GPS coordinates match the GPS coordinates of the store, within pre-defined limits, member identification information for the store may be displayed on a display of device 710.

Figure 7B:
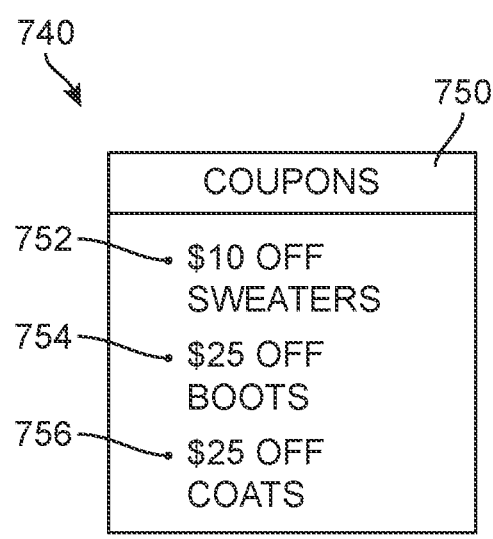
FIG. 7B is an exemplary illustration of coupons a user may view upon entering a store, in one embodiment.

FIG. 7B is an illustration 740 of exemplary coupons 750 a user may view upon entering a store using their all-in-one multi-access device in one embodiment. In this embodiment, using an app operating on device 704, the store sends coupons 750 to the user's device when the store has detected that the user has entered the store. For example, it may do so by establishing a local wireless connection over the store's WiFi network between the user's device and a store device. In illustration 740, coupons 750 include a coupon 752 for sweaters; a coupon 754 for boots; and a coupon 756 for coats.

Figure 8A:
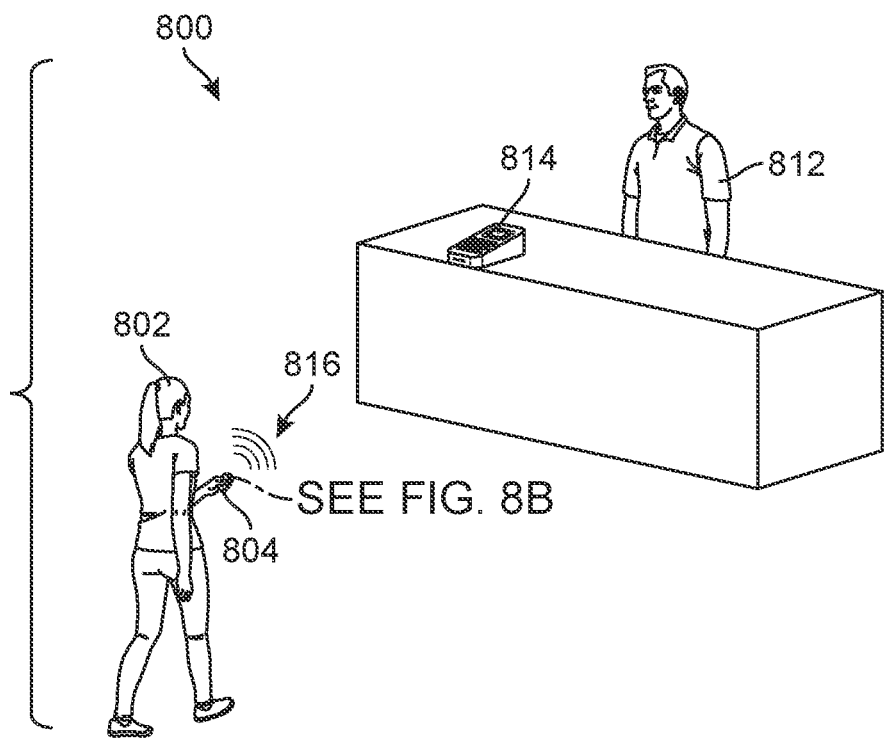
FIG. 8A is an exemplary illustration of a user making a purchase using an all-in-one multi-access device, in one embodiment.

FIG. 8A is an illustration 800 of a user 802 using an all-in-one multi-access device 804 to wirelessly make a purchase, in one embodiment. In this embodiment, user 802 uses an RFID chip in her multi-access device 804 to communicate with an RFID reader installed in the merchant's terminal 814 to wirelessly make a purchase at a store. For context, a store employee 812 is shown in illustration 800. In this embodiment, a virtual pay app running on device 804 mediates this wireless purchase. In this embodiment, the virtual pay app stores the necessary financial account information to allow user 802 to consummate the wireless purchase.

In some embodiments, this financial account information is loaded into the virtual pay app 806 when the device receives a deployable chip card and/or a deployable magnetic strip provided by an affiliate of the financial institution itself, or when virtual pay app 806 is authorized by the financial institution in the case of an RFID chip-enabled embodiment. In some embodiments, the user can load these financial credentials into the virtual pay app by wirelessly transferring these credentials from a different device associated with the financial account, for example a smartphone to which the user has assigned a debit card for the financial account.

In this embodiment, user 802 indicates, for example by using a touchscreen on device 802, that she would like to use the virtual payment app to make this purchase. Device 804 then wirelessly sends a connection signal 816 using an RFID chip, for example, initiating this purchase to a mobile pay platform running on merchant terminal 814. Upon receipt of user 802's financial account credentials stored by the virtual payment app, the mobile pay platform verifies and then debits the associated financial account of user 802.

Figure 8B:
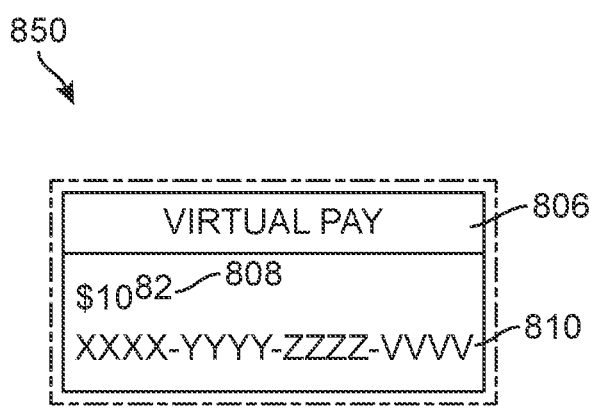
FIG. 8B is an exemplary illustration of a screen showing information displayed by a virtual payment app on an all-in-one multi-access device, in an embodiment.

FIG. 8B is an illustration 850 of a screen showing information displayed by a virtual payment app 806 running on an all-in-one multi-access device during a wireless purchase in one embodiment. In this embodiment, such information includes an amount of the proposed purchase 808 and an account number 810 associated with user 804.

Figure 9A:
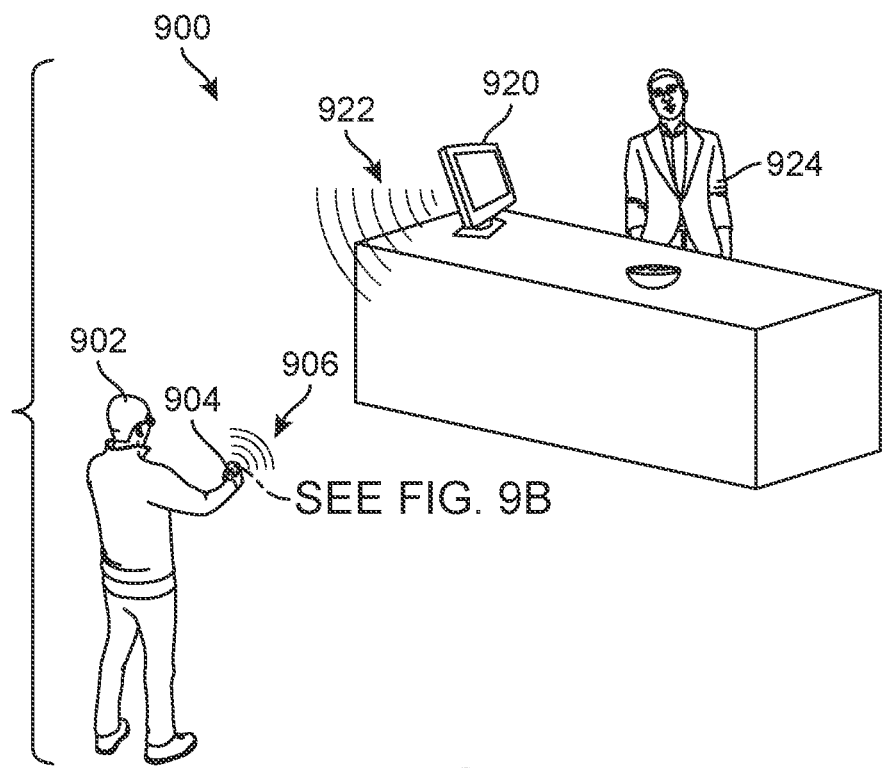
FIG. 9A is an exemplary illustration of a user acquiring a key code on his all-in-one multi-access device, in one embodiment.

FIG. 9A is an illustration 900 of a user 902 wirelessly acquiring a key code on his all-in-one multi-access device 904 in one embodiment. In this example, user 902 has registered for a room in a hotel and wishes to store a key code for this room on device 904. For context, illustration 900 shows a hotel employee 924. A hotel device 920, which in some embodiments is a computer, and device 904 initiate a local wireless connection 906 which may occur via an RFID chip such as chip 318 shown in FIG. 3 or via other communications technologies such as Bluetooth or IEEE 802.11. Connection 906 is mediated by a virtual key app running on device 904. When hotel device 920 and device 904 verify the integrity of wireless connection 906, hotel device 920 transfers a key code for the rented room via a transfer signal 922 so that the RFID chip may receive a code that would unlock the specific hotel room door rented to user 902. In this embodiment, such a key code would be transmitted by user 902 via an RFID chip such as RFID chip 318 shown in FIG. 3 to unlock the door to the hotel room assigned to the user. In other embodiments, multi-access device 904 may use other near field communications technologies that are compatible with the hotel's door lock system.

Figure 9B:
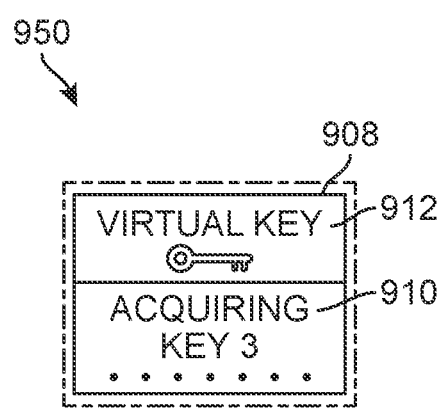
FIG. 9B is an exemplary illustration of a screen showing data displayed on an all-in-one multi-access device while it acquires a key code, in one embodiment.

FIG. 9B is an illustration 950 of a screen showing information displayed on a screen 908 by a virtual key app 912 running on an all-in-one multi-access device 904 while it acquires a key code in one embodiment. In this embodiment, such information includes a designation 910 for this particular key code. In this embodiment, because the user stores multiple key codes on device 904, each separate key code requires its own designation. When the user wishes to unlock the door of his rented room, he selects this designated key from his all-in-one multi-access device. That device transmits this key code to the door of his room, which then unlocks the door upon receipt of this code.

The embodiments illustrated in FIGS. 7A, 7B, 8A, 8B, 9A and 9B that use RFID technology perform best if the RFID chip is an active RFID chip that is powered by a battery, since active RFID chip generally have a longer range than passive RFID chips. However, as noted above, other technologies that are compatible with the hotel's systems, such as NFC or Bluetooth, may be used.

Figures 10A, 10B:
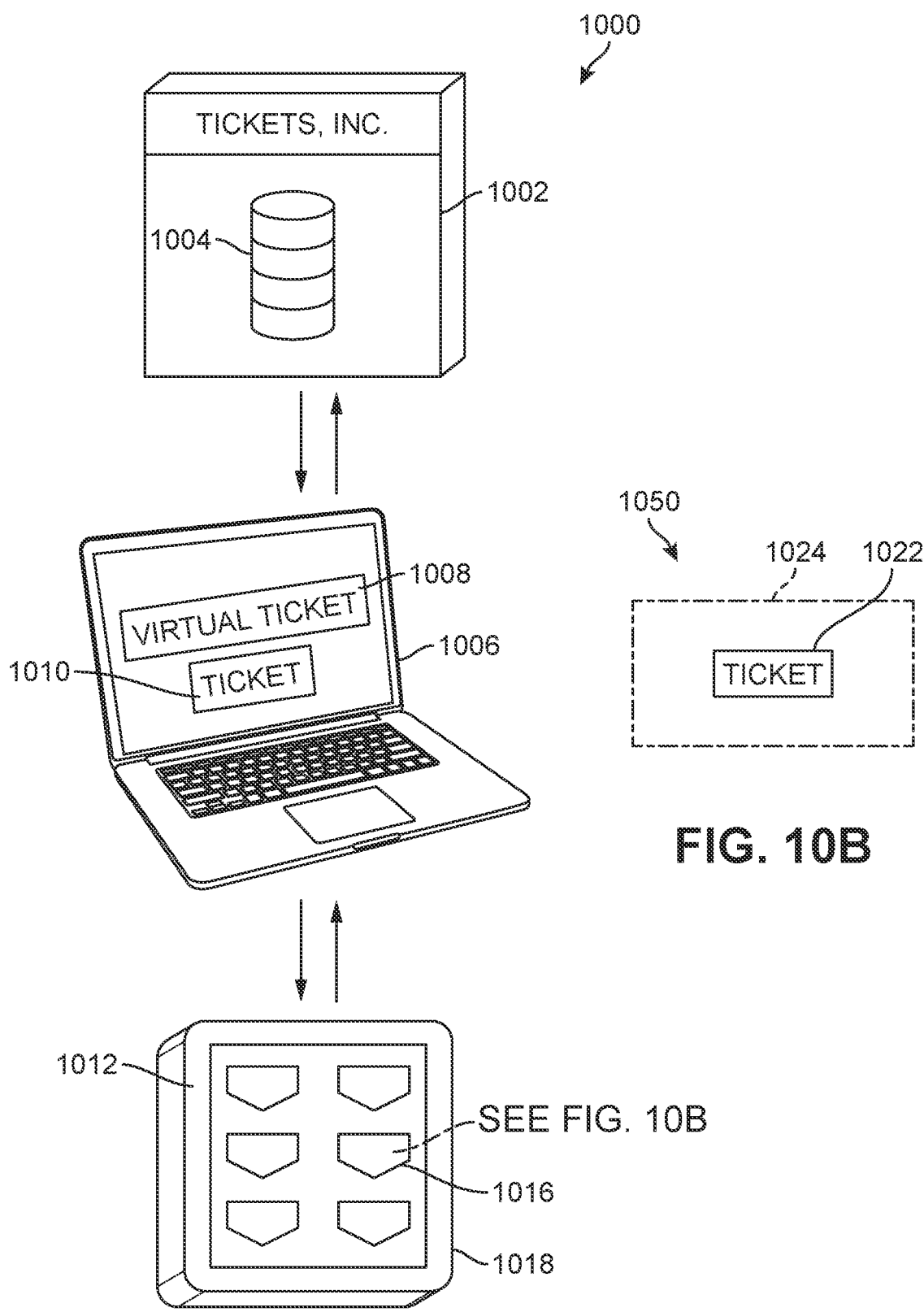
FIG. 10A is an exemplary schematic diagram showing a user loading a virtual ticket onto his all-in-one multi-access device, in an embodiment.
FIG. 10B is an exemplary illustration of a screen showing a virtual ticket loaded onto an all-in-one multi-access device, in an embodiment.

FIG. 10A is a schematic diagram 1000 showing how a user loads a virtual ticket 1010 onto his or her all-in-one multi-access device 1018 in one embodiment. In this embodiment, a ticket selling company 1002 sells tickets to an event online via a ticketing server 1004 connected to the Internet, for example. The user uses a laptop 1006, also connected to the Internet, running a company-specific app 1008 to connect to server 1004 to purchase a virtual ticket 1010 to the event.

In this embodiment, the user can then wirelessly transfer virtual ticket 1010 to device 1018 via a virtual ticketing app 1016 running on device 1018. Upon initiation by the user, device 1018 and laptop 1006 initiate a local wireless connection. In some embodiments, such a local wireless connection may occur via Bluetooth or NFC protocols. Then, the user can transfer the credentials associated with virtual ticket 1010 to a virtual ticket generated and stored by virtual ticketing app 1016.

In some embodiments, virtual ticketing app 1016, upon request by the user, displays on a screen 1012 of device 1018 a facsimile of a paper ticket that includes event and ticket purchase information. In some embodiments, virtual ticket app 1016 broadcasts a code corresponding to the purchased ticket for wireless access to the event.

FIG. 10B is an illustration 1050 of a screen 1024 showing a virtual ticket 1022 loaded onto an all-in-one multi-access device in one embodiment. In this embodiment, laptop 1006 has loaded ticket 1022 onto the multi-access device using the method outlined with reference to FIG. 10A. In some embodiments, the user may then display virtual ticket 1022 to gain access to a private event.

Although in the example shown in FIG. 10A, a virtual ticket is loaded onto all-in-one multi-access device 1018, a similar process could be undertaken to load financial credentials associated with the user into a virtual pay app running on device 1018. In an alternative embodiment, rather than loading financial credentials into a virtual pay app, a defined amount of money credits (for example, $50) could be loaded onto device 1018 for the user to spend. In a further alternative embodiment, rather than laptop 1006 loading a defined amount of money credits onto device 1018, loading money credits could be done from another device. For example, another all-in-one multi-access device that also has a virtual payment app and using its user's own financial credentials, could load a defined amount of money onto device 1018 via a wireless. In some embodiments, such a connection could be implemented using Bluetooth or NFC protocols, or could be accomplished remotely over the Internet.

Figure 11A:
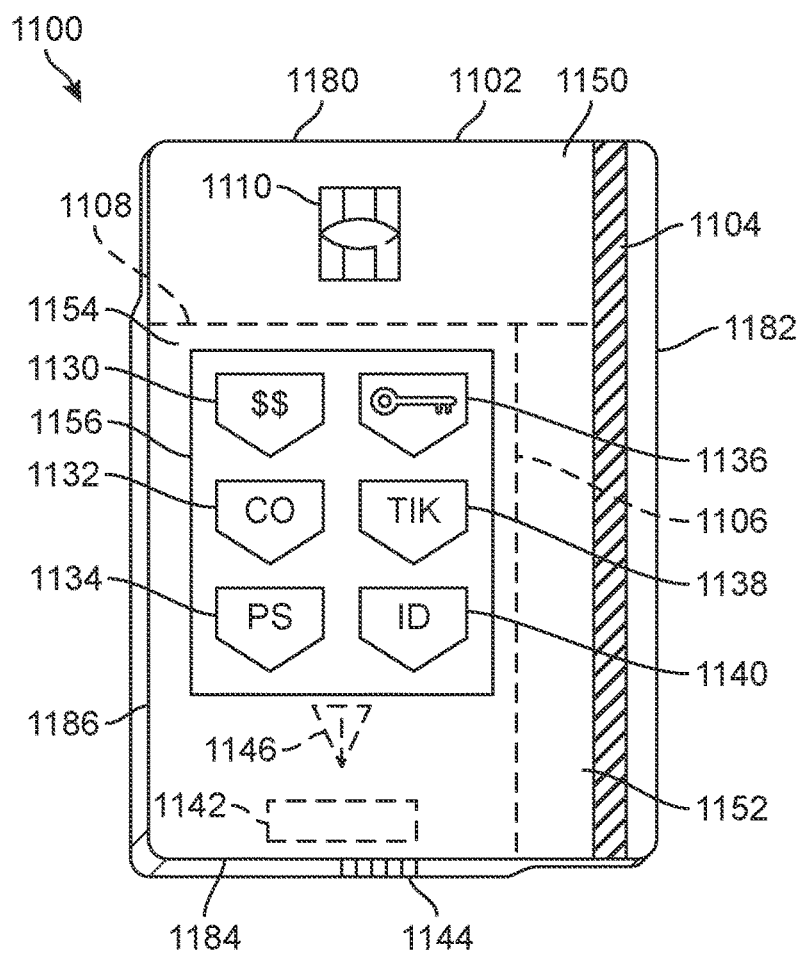
FIG. 11A is a schematic plan view of an all-in-one multi-access device with a form factor that matches the form factor of a credit card, in an embodiment.

FIG. 11A is a schematic diagram 1100 of a perspective view from the front of a credit-card-shaped embodiment of an all-in-one multi-access device 1102. In this embodiment, multi-access device 1102 may comprise distinct regions, including a main body screen region 1154, a magnetic strip region 1152, and a chip region 1150.

For purposes of understanding the different regions of the device, reference is made to the device's outer edges, including a first (or top) edge 1180, a second (or right) edge 1182, a third (or bottom) edge 1184, and a fourth (or left) edge 1186. Additionally, reference is made to a first inner boundary 1106 and a second inner boundary 1108. These inner boundaries correspond to regions where the thickness of the device may change.

Chip region 1150 extends from a first edge 1180 at the top of all-in-one multi-access device 1102 inwards to second interior boundary 1108. Chip region 1150 also extends from second edge 1182 to the opposing fourth edge 1186. Magnetic strip region 1152 extends from second edge 1182 inwards to first interior boundary 1106. Magnetic strip region 1152 also extends from first edge 1180 to the opposing third edge 1184. As seen in FIG. 11A, there may be an overlap of chip region 1150 and magnetic strip region 1152 in a corner of multi-access device 1102, adjacent where first edge 1180 and second edge 1182 meet.

Main body region 1154 comprises a region of multi-access device 1102 that extends between fourth edge 1186 and first interior boundary 1106 along a width of the device, and between third edge 1184 and second interior boundary 1108 along a part of the length of the device.

Main body region 1154 includes a display screen 1156. In this example, display screen 1156 shows exemplary apps, such as app 1130, app 1132, app 1134, app 1136, app 1138 and app 1140. In this example, app 1130 is a virtual pay app that provides the link between device 1102 and one or more financial accounts associated with the user. App 1136 is a virtual key app that a user could use to unlock locks at doors or otherwise gain entry to physical places such as cars, buildings garages, parking lots, homes and offices, using codes previously loaded into the multi-access device. App 1132 may be a virtual-coupon app through which stores with compatible systems and networks could transmit store coupons and sales information to device 1102. App 1134 may contain and display a user's personal critical health information. App 1138 may be a virtual ticketing app that displays virtual tickets that, for example, a user may have purchased using app 1138 to gain entry to entertainment or transportation venues. App 1140 may contain and display identifying or useful information such as a driver's license, a passport, a visa, a car registration, an employee ID or an insurance card.

In this embodiment, multi-access device 1102 may include a communications antenna 1146 (shown in FIG. 11A in phantom) for wirelessly exchanging data and instructions between device 1102 and other compatible devices such as merchant terminals and devices that manage access to physical spaces, for example. Multi-access device 1102 may also include an RFID chip, such as RFID chip 318 shown in FIG. 3, which could be used to make purchases at RFID reader-enabled merchant terminals. In this embodiment, device 1102 includes a rechargeable battery 1142 (shown in phantom) which provides power to operate multi-access device 1102 and a jack 1144 which provides the connection for charging battery 1142. In some embodiments, battery 1142 may be charged using induction coupling (in which cases jack 1144 may not be needed). In other embodiments, battery 1142 is a replaceable battery rather than a rechargeable battery (in which case jack 1144 may also not be needed). In yet other embodiments, the components in multi-access device 1102 may be powered by an RFID power supply circuit. Main body screen region 1154 may also include other components shown in FIG. 2 and FIG. 3.

Magnetic strip region 1152 includes a magnetic strip 1104. It has the thickness required to allow magnetic strip region 1152 to slide through a magnetic strip reader at a merchant terminal. Chip region 1150 includes a chip 1110, which has the thickness required to insert the chip region 1150 into a chip reader at a merchant terminal.

In the embodiment of FIG. 11A, the length and width of the device generally match the length and width of a conventional credit card. In some embodiments, multi-access device 1102 has a roughly uniform thickness, while in other embodiments, multi-access device may have different thicknesses. In the embodiment shown in FIG. 11A, the three regions of multi-access device 1102 may have different thicknesses. Specifically, the thickness of both chip region 1150 and magnetic strip region 1152 may be substantially less than the thickness of main body region 1154.

As noted above, in some embodiments, chip region 1150 has a thickness that is selected so that chip region 1150 can slide into a conventional chip reader. Likewise, as also noted above, magnetic strip region 1152 has a thickness that is selected so that magnetic strip region 1152 can slide into a conventional magnetic strip reader. In some embodiments, the thicknesses of chip region 1150 and magnetic strip region 1152 may match the thickness of a conventional credit card. By contrast, the thickness of main body screen region 1154 may be selected to physically accommodate all of the various components, such as a battery, an antenna, and a memory, as well as the other components described above.

Figure 11B:
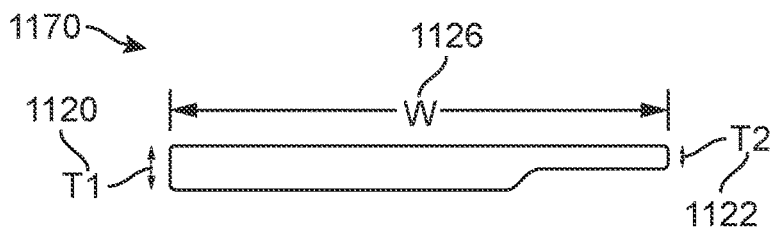
FIG. 11B is an exemplary illustration of an end view of the device shown in FIG. 11A, in an embodiment.

FIG. 11B is an exemplary illustration 1170 of an end view of the multi-access device of FIG. 11A, as seen from the bottom, in an embodiment. In this embodiment, the magnetic strip region 1152 has a thickness that is substantially less that the thickness of the main body screen region 1154. Thus, in this embodiment, main body screen region 1154 has a thickness T1 1120 that is substantially greater than the thickness T2 1122 of the magnetic strip region 1152.

In this embodiment, thickness T2 substantially matches the thickness of a conventional credit card. For example, in one embodiment, thickness T2 may be within approximately 10% of the thickness of a conventional credit card. As described above, a conventional credit card may have an approximate thickness of 0.75 mm. FIG. 11B also identifies the width W 1126 of multi-access device 1102.

Figure 11C:
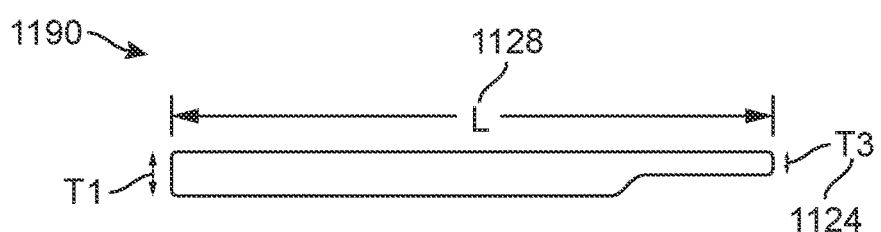
FIG. 11C is an exemplary illustration of a side view of the device shown in FIG. 11A, in an embodiment.

FIG. 11C is an exemplary illustration 1190 of a side view from the right side of device 1102. This view shows that the thickness T3 1124 of device 1102 may be less in the chip region 1150 than in the main body screen region 1154. Thus, in this embodiment main body screen region 1154 has a thickness T1 that is substantially greater than the thickness T3 of chip region 1150. In some embodiments, thickness T3 of chip region 1150 substantially matches the thickness of a conventional credit card. For example, in one embodiment, thickness T3 may be within approximately 10% of the thickness of a conventional credit card. FIG. 11c also identifies the length L 1128 of multi-access device 1102.

Although the embodiments show a device with regions having different thicknesses, in other embodiments a multi-access device could have a substantially constant thickness everywhere. Moreover, to ensure that the device may be backwards compatible with magnetic strip readers and chip readers, the thickness of a device with a uniform thickness may be approximately equal to the thickness of a conventional credit card. In such embodiments, the features of the device may be selected to ensure that the necessary components to perform those features can fit into a main body region with a thickness approximately matching that of a conventional credit card.

While various embodiments have been described above, the description is intended to be exemplary, rather than limiting and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. A multi-function access device comprising:
   a display screen, a processor, and a communications app;
   a battery providing power to the display screen, the processor, and the communications app;
   an RFID chip in communication with the processor; and
   the display screen showing a plurality of icons, wherein the display screen and the processor are configured such that touching an icon on the display screen triggers a functionality represented by that icon;
   wherein the processor is configured to control the display screen, the communications app and the functionality represented by the icons;
   wherein the processor is also configured to provide key codes to the RFID chip for transmittal to locks such that the functionality of at least one of the plurality of icons includes unlocking a lock;
   wherein the functionality of at least one of the plurality of icons provides an access point for gaining access via the communications app to data stored in a database of a financial institution;
   wherein the functionality of at least one of the plurality of icons facilitates wireless payments via the communications app to merchant terminals; and
   wherein the plurality of icons includes an icon for the user to store identifying information and medical information about the user on the access device to facilitate display of only the identifying information and the medical information on the display screen of the access device when triggered by an emergency information display device associated with medical personal without unlocking the access device.

2. The multi-function access device of claim 1, wherein the multi-function access device comprises at least one of a slot comprising a chip that is deployed by pressing a chip actuating mechanism and a slot comprising a magnetic strip, wherein the magnetic strip can be deployed by actuating a magnetic strip actuating mechanism.

3. The multi-function access device of claim 1, wherein the multi-function access device comprises guides that hold a removable cover in place.

4. The multi-function access device of claim 3, wherein the removable cover comprises at least one of a chip and a magnetic strip.

5. The multi-function access device of claim 1, further comprising an antenna for communicating with external devices via at least one of near field communications technology, Bluetooth technology and WiFi technology.

6. The multi-function access device of claim 1, wherein at least one of the icons is configured to allow emergency medical technicians to view the user's medical information.

7. A multi access device comprising:
 a processor;
 an antenna controlled by a communications app configured to transmit and receive data wirelessly using at least one of Bluetooth, near field communications, WiFi and IEEE 802.11 technologies;
 a plurality of apps controlled by the processor for providing access to a plurality of access points via the antenna, wherein the access points include access points for gaining access to databases of at least one of a bank, a credit card company, a retailer, and an entertainment venue, the plurality of apps including an app configured to facilitate payments to merchants via the antenna;
 at least one RFID chip in communication with the processor configured to transmit codes to unlock locks;
 a screen displaying icons for activating the plurality of apps;
 at least one slot comprising at least one of a magnetic strip and a chip for implementing payments for purchases at retailers;
 wherein the multi-access device comprises a biometric device in communication with the processor for confirming a user as authorized to operate the multi-access device; and
 wherein the plurality of apps includes an app for the user to store identifying information and medical information about the user on the access device to facilitate display of only the identifying information and the medical information on the display screen of the access device when triggered by an emergency information display device associated with medical personal without unlocking the access device.

8. The multi-access device of claim 7, wherein the multi-access device comprises a memory that comprises the user's medical information, and the processor is configured to allow access to the user's medical information medical personnel.

9. The multi-access device of claim 7, wherein the screen is an e-ink display screen.

10. The multi-access device of claim 7, wherein the biometric device is one of a fingerprint reader and an image capture device.

11. The multi-access device of claim 7, wherein the multi-access device uses one of a spring-loaded mechanism and a servomechanism to deploy at least one of the magnetic strip and the chip.

12. The multi-access device of claim 7, wherein the multi-access device has a magnetic strip region, and a thickness of the multi-access device in its magnetic strip region is dimensioned such that the magnetic strip is read by a magnetic strip reader.

13. The multi-access device of claim 7, wherein the multi-access device has a chip region, and a thickness of the multi-access device in the chip region is dimensioned such that the chip is read by a chip reader.

14. A multi-access device comprising:
 a generally rectangular body having a top rectangular region characterized by a first thickness, a side rectangular region characterized by a second thickness, and a main body screen region characterized by a third thickness;
 a chip in the top rectangular region, wherein the top rectangular region is dimensioned to fit into a chip reader and is configured to be read by a chip reader;
 a magnetic strip in the side rectangular region, wherein the side rectangular region is dimensioned to allow the side rectangular region to slide through a magnetic strip reader, and is configured to be read by a magnetic strip reader;
 the main body screen region comprising a display screen, a processor, a communications app, a memory, an antenna and a rechargeable battery;
 an RFID chip configured to receive key codes from the processor; wherein the rechargeable battery provides power to the processor, the communications app, the RFID chip and the memory;
 wherein the display screen displays a plurality of icons, each icon representing a specific functionality that is implemented by actuating the icon;
 wherein at least one of the icons facilitates payments to merchant terminals when it is actuated, at least one of the icons provides access to a financial institution when it is actuated, at least one of the icons uses the key codes to unlock locks when it is actuated, and at least one of the icons allows a user to store identifying information and medical information about the user on the access device to facilitate display of only the identifying information and the medical information of the display screen of the access device when triggered by an emergency information display device associated with medical personal without unlocking the access device.

15. The multi-access device of claim 14, wherein the first thickness, the second thickness and the third thickness are equal to within approximately 10%.

16. The multi-access device of claim 14, wherein the third thickness is greater than both the second thickness and the first thickness by more than 50%.

17. The multi-access device of claim 14, wherein at least one of the icons is a virtual ticketing app that displays tickets that have been purchased by the user of the multi-access device.

18. The multi-function access device of claim 14, comprising a personal a icon that provides access to the medical information.

19. The multi-function access device of claim 14, wherein the display screen is an e-ink screen.

* * * * *